M. SENSENSCHMIDT & E. KAISER.
CONTROL DEVICE FOR TICKET STAMPING MACHINES.
APPLICATION FILED JUNE 20, 1910.
1,025,317.
Patented May 7, 1912.
6 SHEETS—SHEET 2.
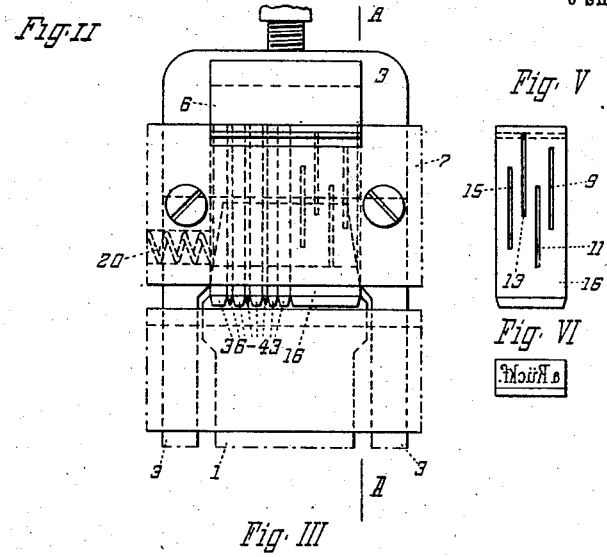
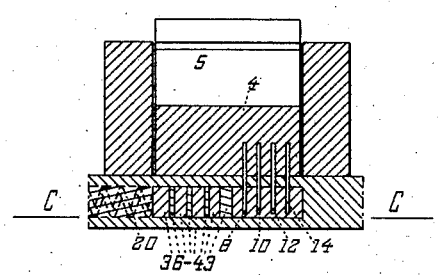
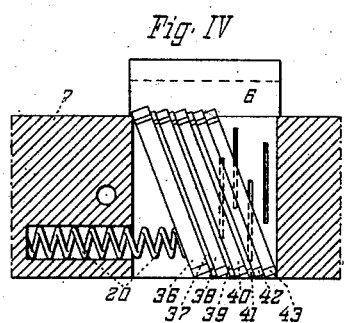
Witnesses:
Inventors:

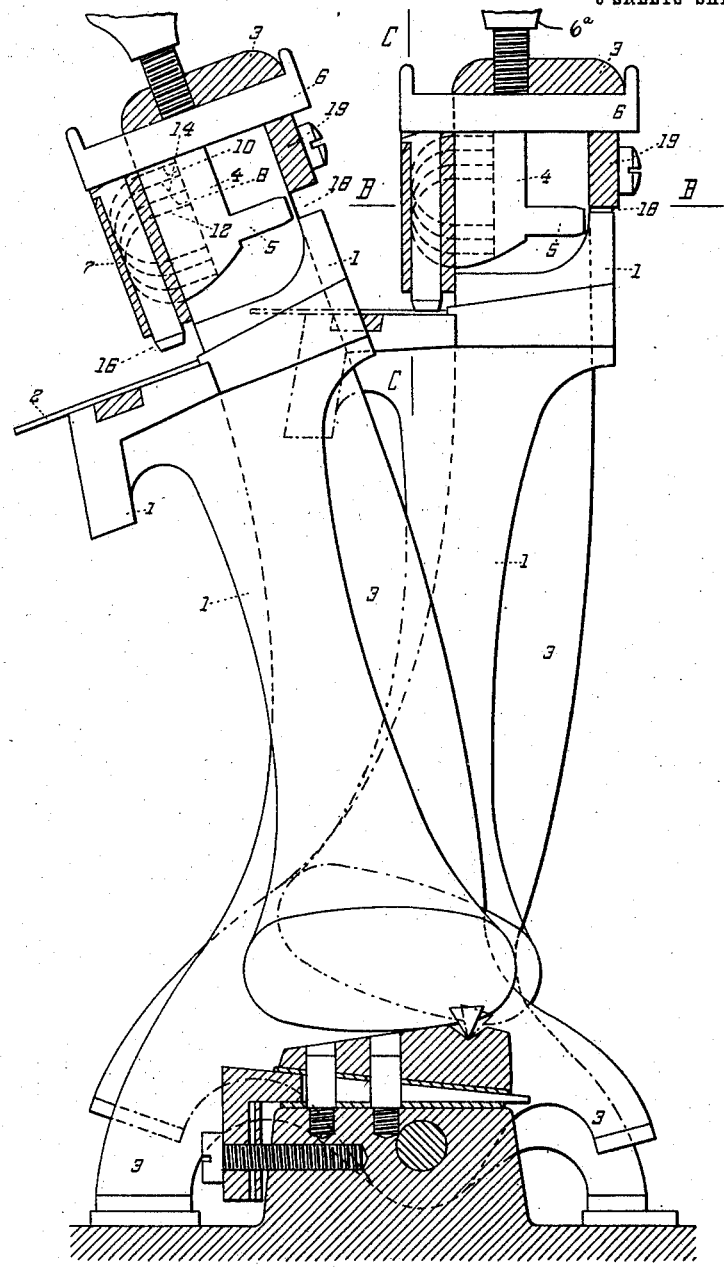

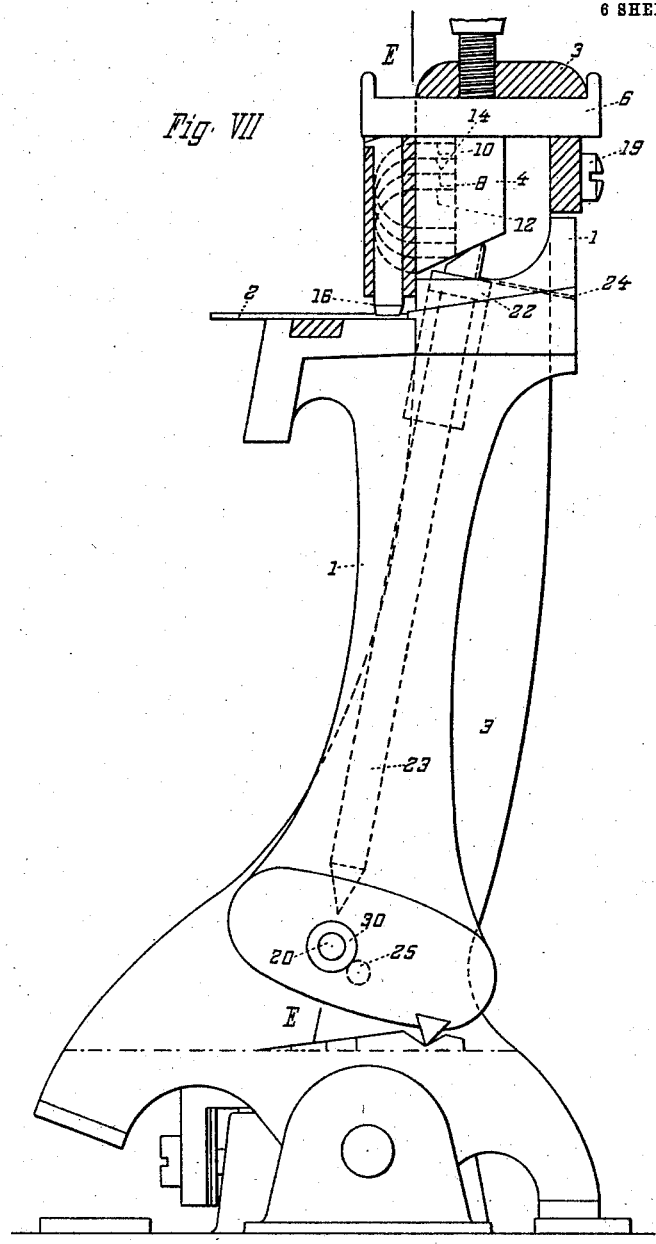

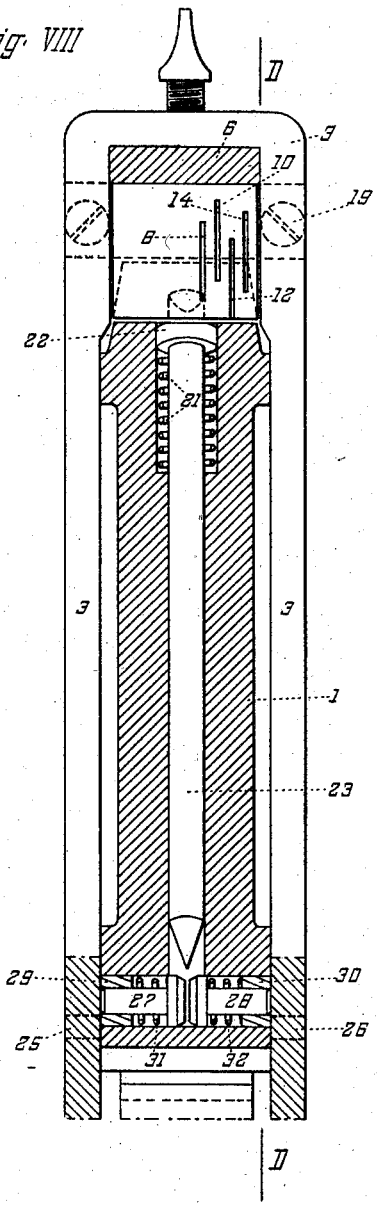

M. SENSENSCHMIDT & E. KAISER.
CONTROL DEVICE FOR TICKET STAMPING MACHINES.
APPLICATION FILED JUNE 20, 1910.
1,025,317.
Patented May 7, 1912.
6 SHEETS—SHEET 5.
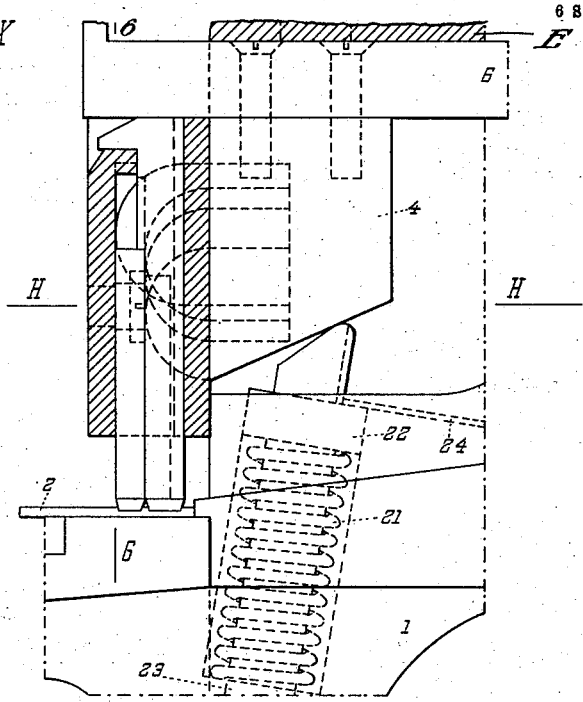
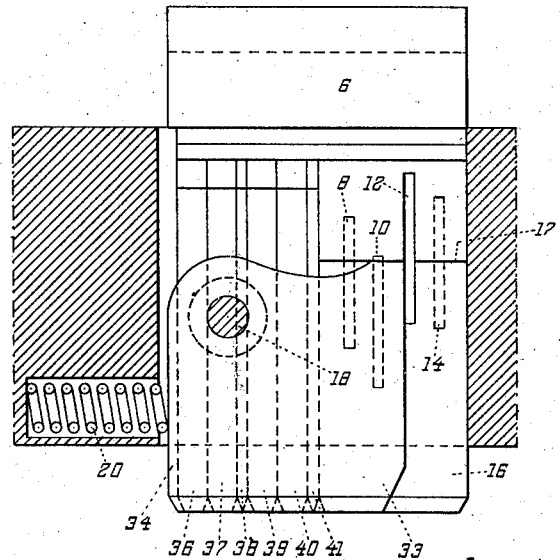
Witnesses:
Inventors:

M. SENSENSCHMIDT & E. KAISER.
CONTROL DEVICE FOR TICKET STAMPING MACHINES.
APPLICATION FILED JUNE 20, 1910.
1,025,317.
Patented May 7, 1912.
6 SHEETS—SHEET 6.
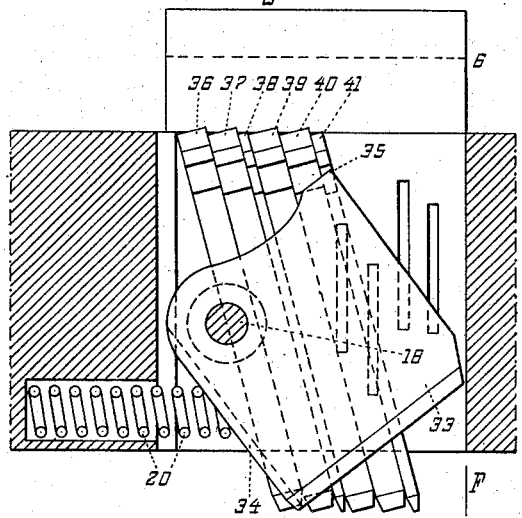
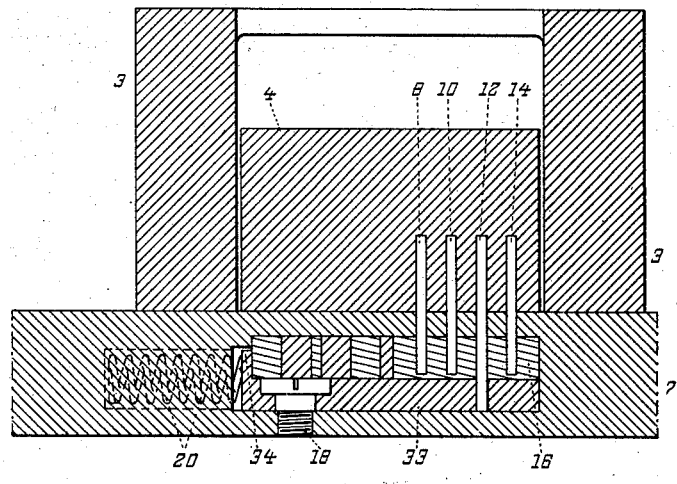

UNITED STATES PATENT OFFICE.

MAX SENSENSCHMIDT AND EDUARD KAISER, OF FRANKFORT-ON-THE-MAIN, GERMANY.

CONTROL DEVICE FOR TICKET-STAMPING MACHINES.

1,025,317. Specification of Letters Patent. Patented May 7, 1912.

Application filed June 20, 1910. Serial No. 568,002.

*To all whom it may concern:*

Be it known that we, MAX SENSENSCHMIDT and EDUARD KAISER, both subjects of the German Emperor, and residents of 44 Taunusstrasse, Frankfort-on-the-Main, Germany, have invented certain new and useful Improvements in and Relating to a Control Device for Ticket-Stamping Machines, of which the following is a specification.

The invention consists of a controlling device on ticket stamping machines and it serves to prevent the wrong use of said machines by the attendants and an easy control excluding any danger of deceiving and consequently to prevent irregularity during the work at the well known ticket stamping machines for instance simple types are used as control-types having the same dimensions as the rest of the types. Therefore the possibility is given to insert no control-type or a type without sign so that the tickets receive the stamp of the day but no control sign; furthermore a false control type can be inserted and a later control made impossible. By using the present invention the stamping machine can only be operated and the tickets can receive the date stamp of the day only if the correct control type is inserted into the machine.

In the accompanying drawing in which we have illustrated our invention in three sample constructions like letters of reference refer to like parts throughout the various views.

Figure 1 shows a longitudinal section according to line A of Fig. 2 of a form of construction of our improvement in connection with one of the commonly used ticket stamping machines. Fig. 2 shows partly a front view of Fig. 1. Fig. 3 shows a cross-section according to line B of Fig. 1. Fig. 4 shows partly a longitudinal section according to line C of Fig. 3. Figs. 5 and 6 show details of the device. Fig. 7 shows a longitudinal section of a modification according to line D of Fig. 8. Fig. 8 shows a longitudinal section according to line E of Fig. 7. Figs. 9–12 show still another modification of the device.

The longitudinal section according to line A of Fig. 2 shows the stamping machine in its two final positions; and it illustrates the position directed obliquely to the front the position of rest while the rearward position illustrates the position when the tickets are stamped. Such ticket stamping machine consists in its essential known parts of a turnably mounted casing 3 and of counter pressure piece 1 balancing upon a blade-bearing. At the stamping of the ticket by pressing the device rearward the counter pressure piece 1 and the casing 3 move in the direction of their longitudinal axis in consequence of the different positions of the turning casings and the types located in a type chamber 7 on the front part of the casing 3 and acting under the influence of a laterally arranged pressure spring 20 enter into the ticket placed upon the upper part of the counter pressure piece 1. The upper opening of the type chamber 7 is closed by a slide 6 adjustable by a thumb nut 6ª. At the exchanging of the types said nut is unscrewed and the slide 6 moved rearward whereafter the types, which are supported on the border of the type chamber 7 by means of noses, can be removed. Our present invention differs from this well known construction in so far as to the slide 6. A projecting piece 4 is attached which is provided on its front end with several stops 8, 10, 12, 14 and on the rear with a pin 5. The stops, the number and arrangement of which can be chosen at will, fit exactly the corresponding cuttings 9, 11, 13, 15 of the control or return type 16. The width of the pin 5 agrees with the intermediate space 18 which in the position of rest of the stamping machine is formed by a border face of the counter pressure piece 1 and of a border face of the part 19 of the casing. This space 18 disappears at the stroke of the machine to the rear by means of the motion of the piece 1 toward the casing. In order to prevent the accidental or abusing use of wrong control types the position or the dimensions of the cuttings 9, 11, 13, 15 is differently chosen for each machine and so is the projecting piece 4. If all types including the correct control type 16 are inserted into the opened type box 7 the slide 6 can be closed and arrested as the stops 8, 10, 12, 14 can freely enter the cuttings 9, 11, 13, 15 of the control type leaving the intermediate space 18 free in order to make the stamping machine ready for use. If however a wrong control type is inserted the cuttings of which do not correspond with the stops 8, 10, 12, 14 of the projecting piece 4 the closing of the slide 6 is prevented as the stops 8, 10, 12, 14 can not enter the wrong control type. By this the pin 5 remains in the space 18 preventing the use of the machine as said pin 5 prevents the approaching of the edge faces bordering the space 18. The same effect is attained if no control type is inserted as then by means of the pressure of the spring 20, the types are moved into an oblique position into the space for the control type (Fig. 4) so hindering the advancing motion of the slide 6 and of the stops 8, 10, 12, 14.

According to the modification shown in Figs. 7 and 8 the pin 5 is left away and another mechanism occupies its place. The projection 4 is obliquely cut on its lower face against which rests the upper end of the pin 23 movably arranged in a channel of the counter pressure piece 1, which pin acts under the influence of pressure spring 21 supported by a collar 22 and is secured against the jumping outward to the top by a stop reaching over the collar 22. In a cross-bar of the counter pressure piece 1 shortly below the pointed lower end of the pin 23 are movably located two bolts 27, 28 guided in the rings 29, 30 behind the head of which bolts catch the pressure springs 31, 32. If the device is in the state of rest the bolts 27, 28 rest exactly in front of the openings 25, 26 which are arranged in the side parts of the casing 3. If the slide 6 is opened which operation is only possible if the machine is in the state of rest, the projecting piece 4 presses downward by means of its oblique gliding face the pin 23, by which motion the pointed end enters between the heads of the bolts 27, 28 and moves the same apart and into the openings 25 26. In this state the machine can not be used as the counter pressure piece 1 and the chamber 3 are connected with each other by bolts 27, 28 and in consequence thereof can not execute the motion necessary for the operation of the machine. The same effect is attained if none or a wrong control type is inserted as here also the closing of the slide 6 is prevented.

According to the modification shown in Figs. 9-12 the control line 33 is arranged in front of the types and the control type 16 movably around a pin 18 and acts under the influence of a pressure spring 20. As long as the control type 16 is inserted in the type box 7 it occupies with its nose 17 engaging a corner 35 of the control line 33 the position illustrated in Fig. 10. If however the correct control type is replaced by a false one the same result follows as is described in connection with the other two constructions. If no control type is inserted the control line 33 is moved by the pressure of the spring 20 into the position indicated by Fig. 11 and takes along into an also oblique position by means of a fold 34 the types 36—41 so that the machine can not be used. The control line, which serves for a further control carries a print for instance "Royal ticket delivery, Frankfurt a.M." and permits a double control as its use is only possible by the inserting of the correct control type, if simultaneously the tickets without the print of the control line can be regarded as worthless. The attendant delivering the tickets is consequently forced to use the official correct stamping machine.

What we claim as new and desire to secure by a United States Letters Patent is:—

1. In a control device for ticket stamping machines the combination of a type box, a slide adapted to close said box, a plurality of stops, fixed on said slide, a control type inserted into said box and provided with a plurality of cuttings exactly fitting said stops and adapted to engage the same, and means to prevent the operation of the machine if no control type or a wrong one is inserted into said box substantially as described and for the purpose set forth.

2. In a control device for ticket stamping machines the combination of a type box, a slide adapted to close said box, a plurality of stops fixed on said slide, a control type inserted into said box and provided with a plurality of cuttings exactly fitting said stops and adapted to engage the same a projecting part on said slide and a pin mounted on the rear of said projecting part adapted on opening the slide to occupy the intermediate space between the counter pressure piece and the type casing substantially as described and for the purpose set forth.

In testimony whereof we have hereunto signed our names this 8 day of June 1910, in the presence of two subscribing witnesses.

MAX SENSENSCHMIDT.
EDUARD KAISER.

Witnesses:
 JEAN GRUND,
 CARL GRUND.

Copies of this patent may be obtained for five cents each, by addressing the "Commissioner of Patents, Washington, D. C."